United States Patent
Kanai et al.

(10) Patent No.: US 12,249,686 B2
(45) Date of Patent: Mar. 11, 2025

(54) OXIDE, SOLID ELECTROLYTE AND ALL-SOLID-STATE LITHIUM ION SECONDARY BATTERY

(71) Applicant: KANEKA CORPORATION, Osaka (JP)

(72) Inventors: Kazuaki Kanai, Tokyo (JP); Genta Karino, Saitama (JP)

(73) Assignee: KANEKA CORPORATION, Osaka (JP)

( * ) Notice: Subject to any disclaimer, the term of this patent is extended or adjusted under 35 U.S.C. 154(b) by 474 days.

(21) Appl. No.: 17/703,087

(22) Filed: Mar. 24, 2022

(65) Prior Publication Data

US 2022/0216510 A1    Jul. 7, 2022

Related U.S. Application Data

(63) Continuation of application No. PCT/JP2020/033751, filed on Sep. 7, 2020.

(30) Foreign Application Priority Data

Sep. 27, 2019 (JP) ................................. 2019-177871

(51) Int. Cl.
  *H01M 10/0562* (2010.01)
  *H01M 10/0525* (2010.01)
(52) U.S. Cl.
  CPC ... *H01M 10/0562* (2013.01); *H01M 10/0525* (2013.01); *H01M 2300/0071* (2013.01)
(58) Field of Classification Search
  CPC .................. H01M 10/0562; H01M 10/0525
  See application file for complete search history.

(56) References Cited

U.S. PATENT DOCUMENTS

| | | |
|---|---|---|
| 2010/0047696 A1 | 2/2010 | Yoshida et al. |
| 2011/0053002 A1 | 3/2011 | Yamamura et al. |
| 2016/0064785 A1 | 3/2016 | Kim et al. |

(Continued)

FOREIGN PATENT DOCUMENTS

| | | |
|---|---|---|
| CN | 109888374 A | 6/2019 |
| JP | 2011-051800 A | 3/2011 |
| JP | 2011-073962 A | 4/2011 |

(Continued)

OTHER PUBLICATIONS

Jiang et al. (Solid State Ionics 300 (2017) 73-77)).*

(Continued)

*Primary Examiner* — Olatunji A Godo
(74) *Attorney, Agent, or Firm* — Osha Bergman Watanabe & Burton LLP

(57) ABSTRACT

An LLZ oxide may be a garnet-type oxide that contains Li, La, Zr and O as main constituent elements, and further contains substituent elements such as Zn in addition to the main constituent elements. The substituent elements may contain Bi, Nb, Hf and the like in addition to Zn. The LLZ-type oxide may be used, for example, as a solid electrolyte for an all-solid-state lithium ion secondary battery. The all-solid-state lithium ion secondary battery includes a positive electrode, a negative electrode, and a solid electrolyte layer that is disposed between the positive electrode and the negative electrode.

8 Claims, 7 Drawing Sheets

(56) References Cited

U.S. PATENT DOCUMENTS

2016/0268629 A1  9/2016  Tanaka et al.
2018/0294520 A1  10/2018  Takano et al.

FOREIGN PATENT DOCUMENTS

| | | |
|---|---|---|
| JP | 2013-243111 A | 12/2013 |
| JP | 2016-171068 A | 9/2016 |
| WO | 2017/135461 A1 | 8/2017 |
| WO | 2018/085847 A1 | 5/2018 |
| WO | 2019/032514 A1 | 2/2019 |

OTHER PUBLICATIONS

Hanc et al. (Journal of Solid State Chemistry, vol. 248, Apr. 2017, pp. 51-60).*

Dhivya et al. (ACS Appl. Mater. Interfaces 2014, 6, 17606-17615).*

Kang et al. (The Journal of Physical Chemistry C, 118(31), 17402-17406).*

International Preliminary Report on Patentability issued in corresponding International Application No. PCT/JP2020/033751 mailed Apr. 7, 2022 (6 pages).

Yue Jiang et al., "Investigation of $Mg^{2+}$, $Sc^{3+}$ and $Zn^{2+}$ doping effects on densification and ionic conductivity of low-temperature sintered $Li_7La_3Zr_2O_{12}$ garnets", Solid State Ionics, vol. 300, pp. 73-77, Feb. 2017 (5 pages).

Yan Chen et al., "Origin of High Li+ Conduction in Doped $Li_7La_3Zr_2O_{12}$ Garnets", Chemistry of Materials, vol. 27, pp. 5491-5494, Aug. 6, 2015 (4 pages).

International Search Report issued in corresponding International Application No. PCT/JP2020/033751 mailed Nov. 10, 2020 (3 pages).

Written Opinion issued in corresponding International Application No. PCT/JP2020/033751 mailed Nov. 10, 2020 (3 pages).

* cited by examiner

No.2
$Li_{6.35} Hf_{0.3} La_{2.9} Zn_{0.15} Zr_{1.45} Nb_{0.55} O_{12}$

No.4
$Li_{6.95} Hf_{0.15} La_{2.8} Zn_{0.30} Zr_{1.45} Nb_{0.55} O_{12}$

No.1
$Li_{6.95} Hf_{0.15} La_{2.9} Zn_{0.15} Zr_{1.45} Nb_{0.55} O_{12}$

No.3
$Li_{5.75} Hf_{0.45} La_{2.9} Zn_{0.15} Zr_{1.45} Nb_{0.55} O_{12}$

No.6 $Li_{7.10}Hf_{0.15}La_{2.9}Zn_{0.15}Zr_{1.30}Nb_{0.70}O_{12}$

No.5 $Li_{6.95}Hf_{0.15}La_{2.7}Zn_{0.45}Zr_{1.45}Nb_{0.55}O_{12}$

No.7 $Li_{7.25}Hf_{0.15}La_{2.9}Zn_{0.15}Zr_{1.15}Nb_{0.85}O_{12}$

No. 8
$Li_{6.7}Zn_{0.15}La_{2.85}Bi_{0.15}Zr_2O_{12}$

No. 9
$Li_{6.1}Zn_{0.45}La_{2.85}Bi_{0.15}Zr_2O_{12}$

No. 10
$Li_{6.7}Zn_{0.15}La_{2.70}Bi_{0.30}Zr_2O_{12}$

No. 11
$Li_{6.7}Zn_{0.15}La_{2.55}Bi_{0.45}Zr_2O_{12}$

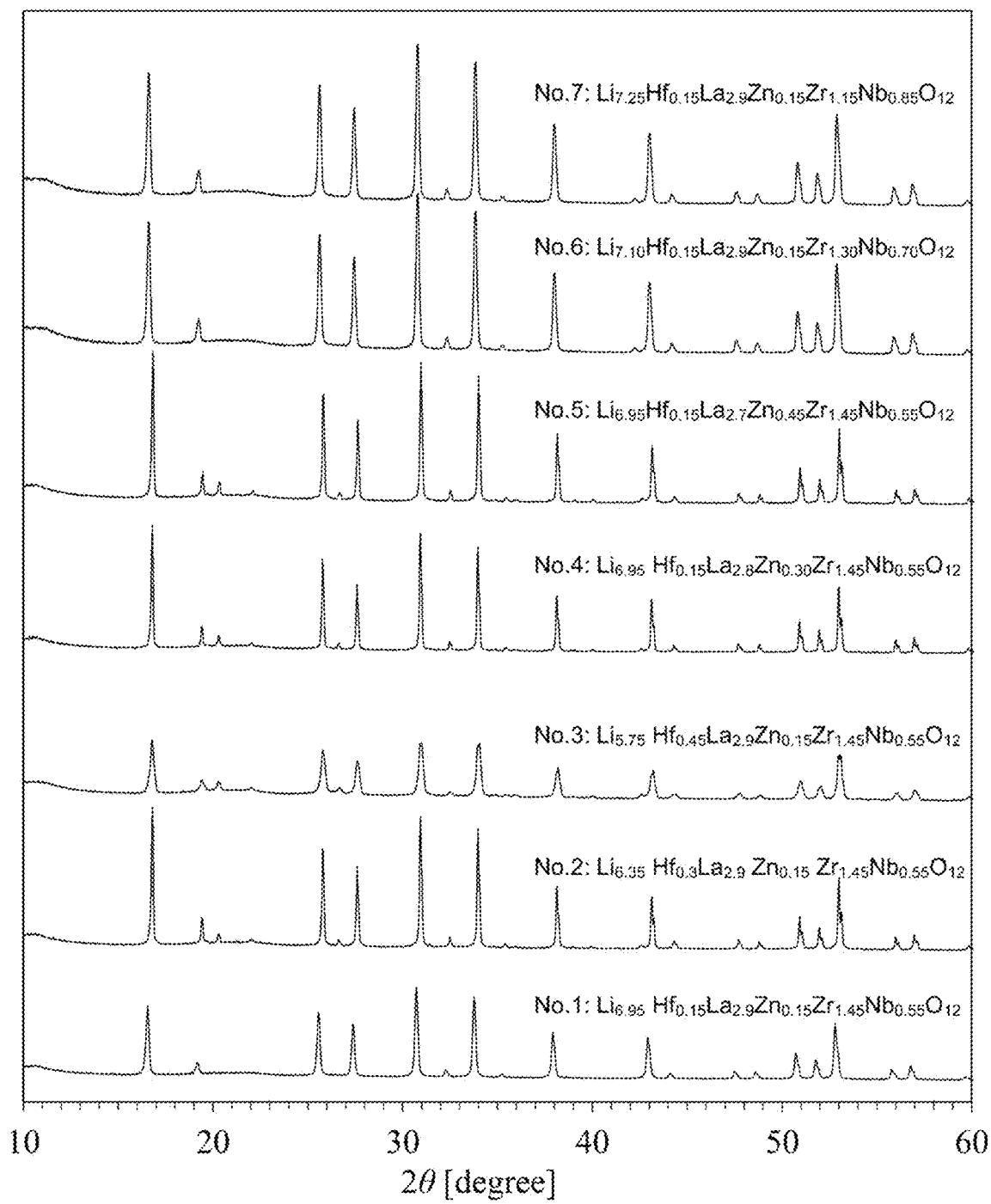

OXIDE, SOLID ELECTROLYTE AND ALL-SOLID-STATE LITHIUM ION SECONDARY BATTERY

TECHNICAL FIELD

One or more embodiments of the present invention relate to an oxide, and a solid electrolyte and an all-solid-state lithium ion secondary battery containing the oxide.

BACKGROUND

Lithium ion secondary batteries have been popularized as power sources for mobile phones and notebook computers. At present, liquid electrolytes (electrolytic solutions) are widely used for lithium ion secondary batteries, and for expanding their uses to in-vehicle applications and the like, all-solid-state secondary batteries using solid electrolytes, etc. are being developed as secondary batteries having high safety, higher capacity and higher power.

$Li_7La_3Zr_2O_{12}$ (LLZ), which is a garnet-type oxide, has attracted attention as a candidate for a solid electrolyte of an all-solid-state lithium ion secondary battery. The garnet-type oxide is generally represented by the composition formula of $A_3B_2C_3O_{12}$, and has a cubic structure. LLZ has $La^{3+}$ occupying an A site (dodecahedron coordination), $Zr^{4+}$ occupying a B site (hexahedron coordination) and $Li^+$ occupying a C site (tetrahedron coordination) and an interstitial position (octahedron coordination), contains excess Li as compared to a general garnet-type structure, and has a unique crystal structure. This may be one reason why LLZ exhibits high lithium ion conductivity in a solid state.

Further, LLZ-based oxides have been reported in which various additive elements are introduced into LLZ. For example, Patent Document 1 reports that denseness and lithium ion conductivity are improved by adding Al as a substitution element in addition to Li, La and Zr as basic elements of LLZ. For example, Patent Document 2 reports that lithium ion conductivity is further improved by adding Nb and/or Ta as substitution elements.

PATENT DOCUMENTS

Patent Document 1: Japanese Patent Laid-open Publication No. 2011-51800
Patent Document 2: Japanese Patent Laid-open Publication No. 2011-73962

From the viewpoints of higher ion conductivity and stability of lithium ions, development of a new material is desired as a solid electrolyte material.

SUMMARY

The LLZ-based oxide is a garnet-type oxide having Li, La, Zr and O as main constituent elements, and contains substitution elements such as Zn in addition to the main constituent elements.

The LLZ-based oxide may contain Bi in addition to Zn, and may have the composition of, for example, $Li_{(7-2j)}Zn_jLa_{(3-k)}Bi_kZr_2O_{(12-\delta)}$ ($0<j<3.5$, $0<k<3$ and $0\leq\delta<1$).

The LLZ-based oxide may contain one or more elements selected from the group consisting of Nb and Hf in addition to Zn as substitution elements. The LLZ-based oxide may have the composition of, for example, $Li_{(7-x+z)}Hf_xLa_{(3-2y/3)}Zn_yZr_{(2-z)}Nb_zO_{(12-\delta)}$ ($0<x<1.75$, $0\leq y\leq3$, $0\leq z<2$ and $0\leq\delta<1$, wherein at least one of y and z is not 0).

The LLZ-based oxide can be used as a solid electrolyte of an all-solid-state lithium ion secondary battery.

BRIEF DESCRIPTION OF THE DRAWINGS

FIG. 3 is an X-ray diffraction chart of a sintered oxide in an example.

DETAILED DESCRIPTION

<Oxide>

Figure 1B:
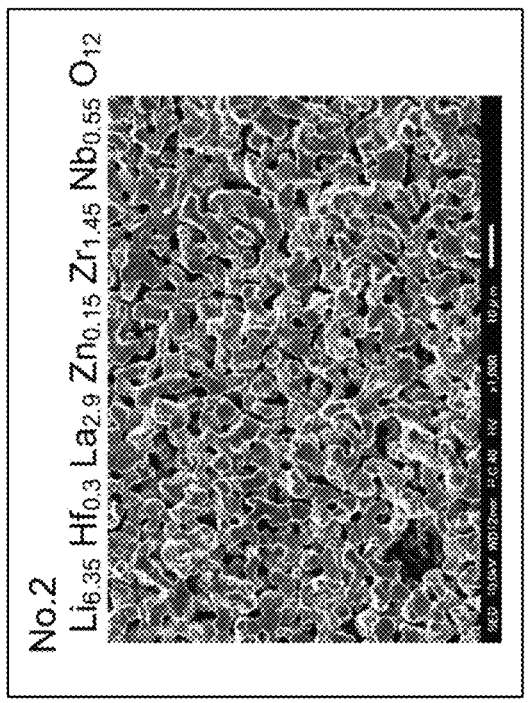
FIGS. 1A to 1G are SEM images of a cross-section of a sintered oxide in examples.
Figure 1D:
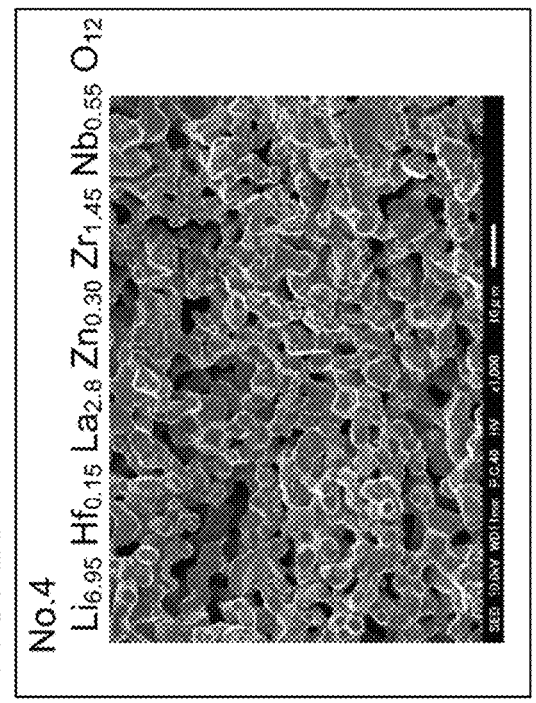
Figure 1A:
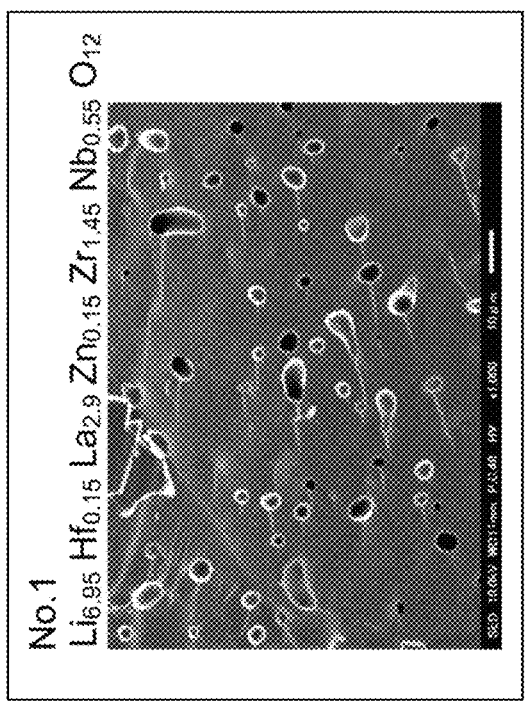
Figure 1C:
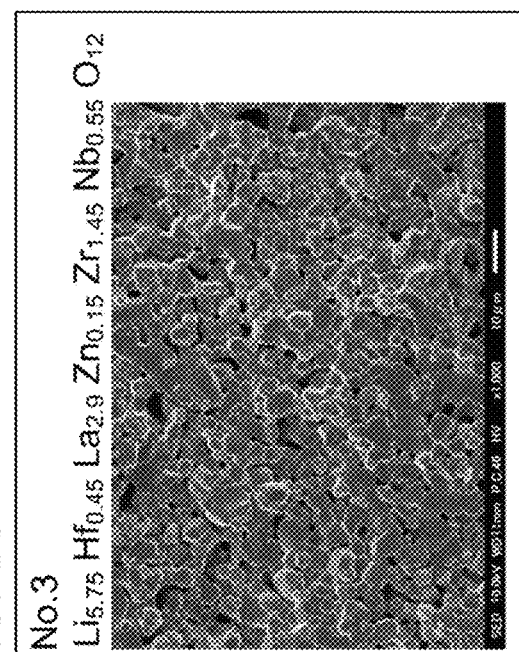
Figure 1F:
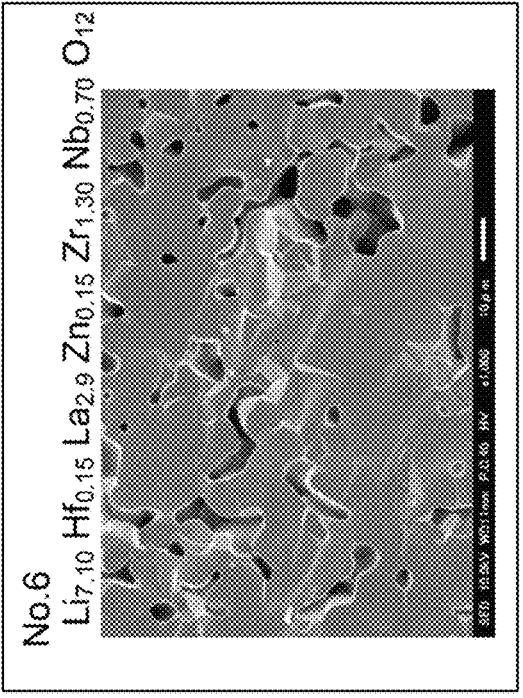
Figure 1E:
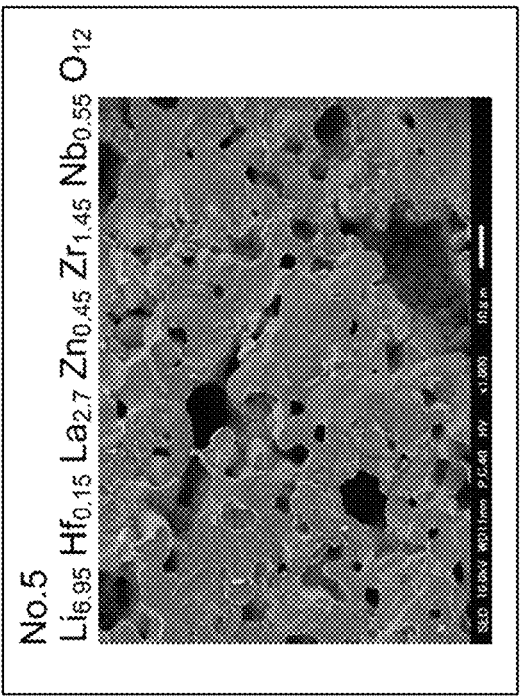
Figure 1G:
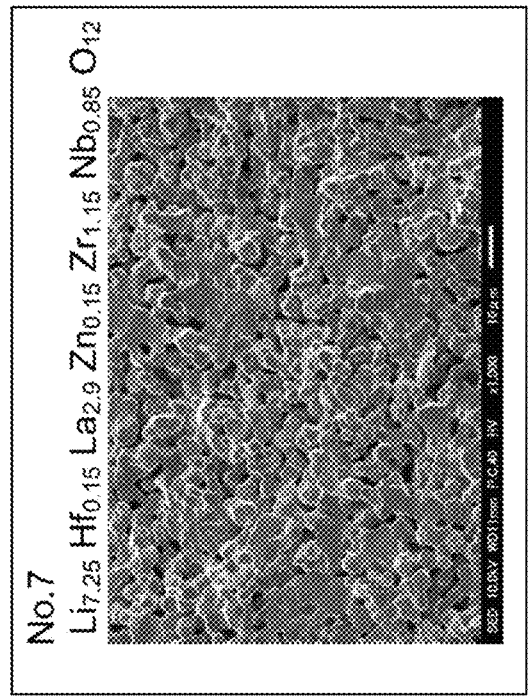
Figure 2A:
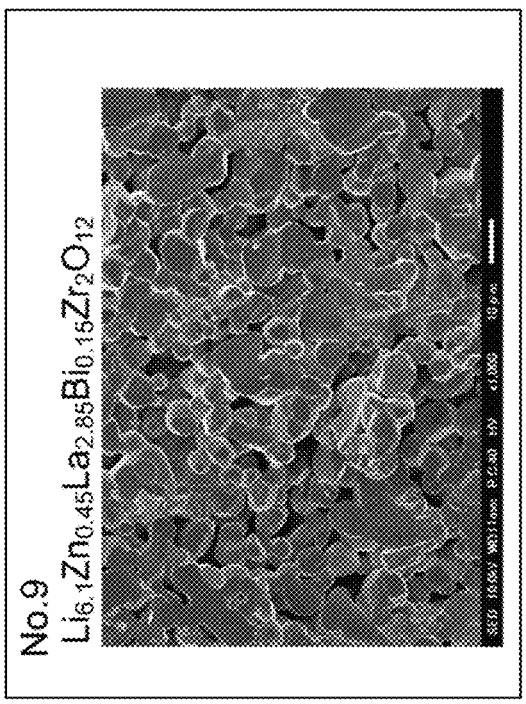
FIGS. 2A to 2D are SEM images of a cross-section of a sintered oxide in examples.
Figure 2B:
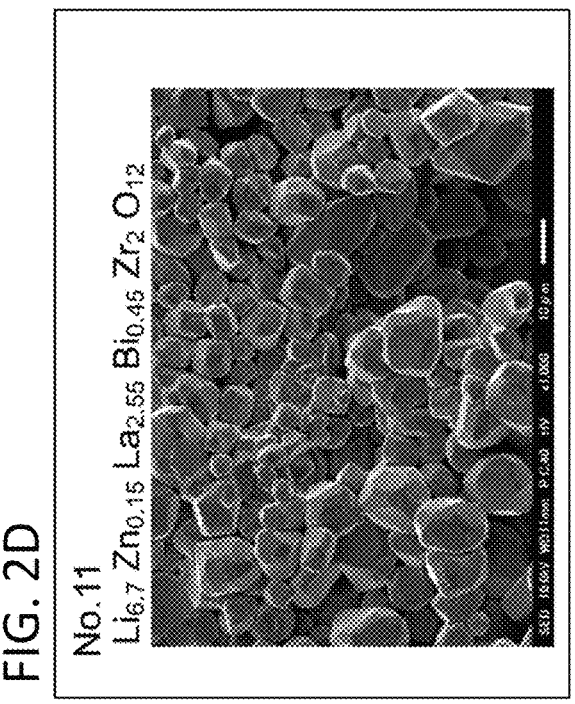
Figure 2C:
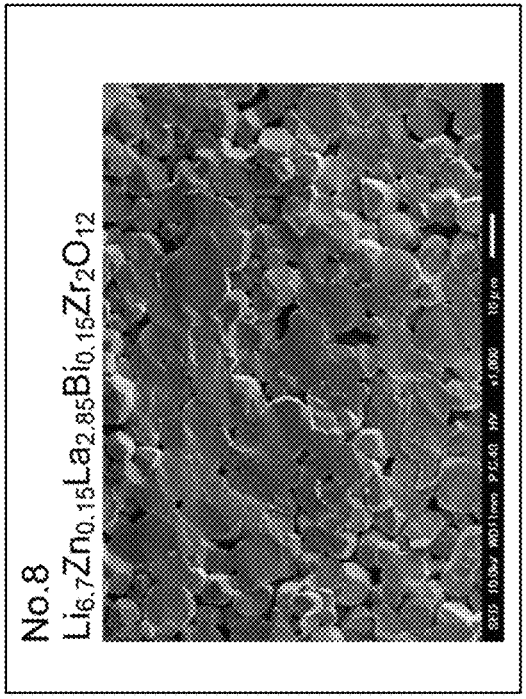
Figure 2D:
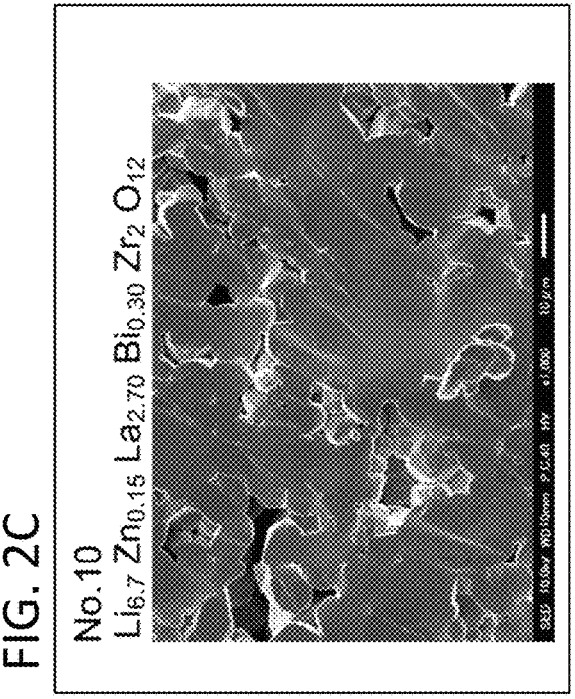

One or more embodiments of the present invention are a garnet-type oxide containing Li, La, Zr and O as main constituent elements. Although crystal structure of garnet-type material is cubic, the garnet-type oxide (LLZ) of the composition formula $Li_7La_3Zr_2O_{12\pm\delta}$ has a cubic phase and a tetragonal phase. In addition, the cubic phase is known to include a low-temperature cubic phase and a high-temperature cubic phase depending on formation conditions, a thermal history and the like. Thus, the crystal structures of LLZ and oxides in which part of metal elements of LLZ is substituted with other metal elements (LLZ-based oxide) may include garnet-type-like crystal structures in addition to a common garnet-type structure. In the present disclosure, the "garnet-type oxide" includes those having a garnet-type-like crystal structure. The garnet-type oxide may have a single phase or a mixture of two or more phases.

LLZ may have oxygen deficiency. In the composition formula $Li_7La_3Zr_2O_{12-\delta}$, δ represents an oxygen deficiency amount. Δ may be 0. Δ is generally less than 1, although it is difficult to strictly measure the oxygen deficiency amount δ. An LLZ-based oxide having a substitution element may also have oxygen deficiency.

The LLZ-based oxide of one or more embodiments of the present invention contains at least Zn as a substitution element in addition to Li, La, Zr and O as main constituent elements. Zn as a substitution element is considered to be introduced into the Li site and/or the Zr site of LLZ. Introduction of Zn as a substitution element tends to improve the ion conductivity of the oxide.

The LLZ-based oxide may contain substitution elements other than Zn. Examples of the substitution element other than Zn include Bi, Nb, Ta, Na, K, Rb, Mg, Ca, Ba, Sr, Ce, B, Al, Ti, V, Cr, Fe, Ni, Sn, Ga, Ge, In, Sc, Y, Lu, Hf, Pr, Nd, Pm, Sm, Eu, W, Gd, Tb, Dy, Ho, Er, Tm, Yb and Lu.

The LLZ-based oxide of one or more embodiments of the present invention contains Bi as a substitution element other than Zn. Bi as a substitution element is considered to be introduced into the La site. When Zn and Bi are contained as the substitution elements, Zn is considered to be preferentially introduced into the Li site. Thus, the LLZ-based oxide of one or more embodiments which contains Zn and Bi as substitution elements can be represented by the composition formula $Li_{(7-2j)}Zn_jLa_{(3-k)}Bi_kZr_2O_{(12-\delta)}$. Here, j is more than 0 and less than 3.5, and k is more than 0 and less than 3. A is an oxygen deficiency amount, and is generally less than 1 as described above.

From the viewpoint of enhancing the effect of substitution with Zn, the amount (j) of substitution with Zn may be 0.05 or more, 0.08 or more, 0.1 or more, 0.12 or more, or 0.15 or more. On the other hand, when the amount of substitution with Zn is excessively large, the ion conductivity may decrease as the amount of Li in the oxide decreases. Thus, j may be 1 or less, 0.7 or less, 0.5 or less, 0.4 or less, 0.3 or less, or 0.2 or less.

$Bi^{3+}$ with a coordination number of 8 (ion radius: 1.17 Å) is substantially equal in ion radius to $La^{3+}$ with a coordination number of 8 (ion radius: 1.16 Å), and therefore, even if the amount (k) of substitution with Bi changes, a significant difference is not produced in crystal structure of the LLZ-based oxide. Thus, the amount (k) of substitution with Bi can be in any range of less than 3. K may be 0.05 or more, 0.075 or more, 0.1 or more, or 0.12 or more, and may be 1 or less, 0.75 or less, 0.5 or less, 0.3 or less, or 0.2 or less.

The LLZ-based oxide of one or more embodiments of the present invention contains Nb and/or Hf as substitution elements other than Zn. Nb as a substitution element is considered to be introduced into the Zr site. Hf as a substitution element is considered to be introduced into the Li site. When Zn and Nb and/or Nb are contained as substitution elements, Zn is considered to be preferentially introduced into the La site. Thus, the LLZ-based oxide of one or more embodiments which contains Nb and/or Hf in addition to Zn as substitution elements can be represented by the composition formula $Li_{(7-x+z)}Hf_xLa_{(3-2y/3)}Zn_yZr_{(2-z)}Nb_zO_{(12-\delta)}$. Here, x is more than 0 and less than 1.75, y is 0 or more and less than 3, and z is 0 or more and less than 2, where at least one of y and z is a number other than 0. When Hf is contained as a substitution element, x is more than 0, and when Nb is contained as a substitution element, z is more than 0. A is an oxygen deficiency amount, and is generally less than 1 as described above.

From the viewpoint of enhancing the effect of substitution with Zn, the amount (y) of substitution with Zn may be 0.05 or more, 0.08 or more, 0.1 or more, 0.12 or more, or 0.15 or more. On the other hand, when the amount of substitution with Zn becomes excessively large, the ion conductivity may decrease as the amount of Li in the oxide decreases. Thus, y may be 1 or less, 0.7 or less, 0.5 or less, 0.4 or less, 0.3 or less, or 0.2 or less.

Since Hf has an ion radius smaller than that of Li, it is considered that when the amount (x) of substitution with Hf increases, the lattice spacing tends to decrease, so that the diffusion path for lithium ions is narrowed. When the amount (x) of substitution with Hf increases, the ion conductivity may decrease as the amount of Li in the oxide decreases. Thus, x may be 1 or less, 0.7 or less, 0.5 or less, 0.4 or less, 0.3 or less, or 0.2 or less. From the viewpoint of obtaining an effect of substitution with Hf, the amount (x) of substitution with Hf may be 0.01 or more, 0.05 or more, 0.08 or more, or 0.1 or more.

When the amount (z) of substitution with Nb increases, the ion conductivity may be improved as the amount of Li in the oxide increases. On the other hand, it is considered that when the amount (z) substitution with Nb increases, the lattice spacing tends to decrease, so that the diffusion path for lithium ions is narrowed. The amount (z) of substitution with Nb may be 0.01 or more, 0.05 or more, 0.1 or more, 0.2 or more, 0.3 or more, or 0.4 or more, and may be 1 or less, 0.8 or less, 0.7 or less, or 0.6 or less.

As described above, the LLZ-based oxide contains Zn, Bi, Hf, Nb and the like as substitution elements, so that the crystal structure (crystal phase or lattice constant) changes or the content of Li ions changes. This is considered to be a factor of changing the ion conductivity of the LLZ-based oxide. The LLZ-based oxide may be cubic. The cubic LLZ-based oxide tends to exhibit a high ion conductivity, and the ion conductivity tends to increase particularly when the crystal has a single phase.

Since substitution elements are contained, occurrence of defects such as voids and abnormal grain growth in the sintered body may be suppressed. In other words, the fact that the substitution element such as Zn acts as a sintering aid, a particle growth inhibitor, or the like, and the density of the sintered body of the LLZ-based oxide increases may also contribute to improvement of the ion conductivity.

The density of the LLZ-based oxide may be 3.5 g/cm$^3$ or more, 3.8 g/cm$^3$ or more, 4.0 g/cm$^3$ or more, 4.2 g/cm$^3$ or more, or 4.4 g/cm$^3$ or more. The density of the oxide can be calculated on the basis of the mass and the volume of a pellet. For example, in the case of a cylindrical pellet, the volume may be calculated from an average of values obtained by measuring the diameter of the pellet at several points with a micrometer and an average of values obtained by measuring the thickness of the pellet at several points with a micrometer.

The lithium ion conductivity of the LLZ-based oxide may be $5.0 \times 10^{-5}$ S/cm or more, $1.0 \times 10^{-4}$ S/cm or more, or $3.0 \times 10^{-4}$ S/cm or more. The lithium ion conductivity can be measured by an alternating-current impedance method. When the ion conductivity of the sintered oxide is measured by an alternating-current impedance method, a plurality of resistance components may be detected.

For example, when the resistance of the crystal grain boundary is large, a bulk resistance indicating the resistance of a crystal grain portion and a grain boundary resistance indicating the resistance of a crystal grain boundary portion are detected. In this case, the ion conductivity may be calculated with the bulk resistance (generally a relatively low resistance) as a resistance component of the oxide.

[Method for Producing Oxide]

The LLZ-based oxide is obtained by mixing a Li compound, a La compound and a Zr compound, which are main constituent element sources, and a compound containing a substitution element such as Zn, and thereafter firing the mixture. As an example, a method will be described in which raw materials are mixed, and the mixture is pre-fired and thereafter primarily-fired (sintered) to produce a sintered oxide.

First, starting substances each containing a relevant element is weighed so as to obtain a stoichiometric ratio in the composition formula of a desired oxide. As the starting material, an oxide, a hydroxide, a chloride, a carbonate, a sulfate, a nitrate, an oxalate or the like of each element may be used. As the mixing method, mixing and grinding may be performed in a dry process, or mixing and grinding may be performed in a wet process with the addition of a solvent. For the mixing, a planetary mill, an attritor, a ball mill or the like may be used. The solvent for performing mixing and grinding in a wet process may be one in which Li is hardly dissolved, and for example, an organic solvent such as ethanol may be used.

It is preferable that the pre-firing of the mixed powder is performed at a temperature equal to or higher than a temperature at which a state change (e.g. generation of gas or phase transition) of the starting material occurs and lower than a sintering temperature. Specifically, the pre-firing temperature may be about 800 to 1200° C. The pre-firing is generally performed in an air atmosphere (oxidizing atmosphere).

The material obtained by the pre-firing is molded into a predetermined shape. The pre-fired materials may be ground and mixed before the molding. Examples of the molding method include a method in which die molding is performed with a binder added to powder; cold isostatic pressing (CIP); hot isostatic pressing (HIP); and hot pressing. The sintering may be performed in an air atmosphere, or may be performed in an atmosphere of an inert gas such as nitrogen or argon. If necessary, firing may be performed in a reducing atmosphere. The sintering temperature may be higher than the pre-firing temperature, and specifically, the sintering temperature may be 1100° C. or higher, or 1150° C. or higher.

The above-described method is an example, and it is also possible to obtain an LLZ-based oxide by another method. For example, an LLZ-based oxide having a desired composition can also be produced by a mechanochemical method with raw material powder mixed with a flux.

[Uses of Oxide]

The LLZ-based oxide can be used as a solid electrolyte of an all-solid-state battery, and is particularly preferably used as a solid electrolyte of an all-solid-state lithium ion secondary battery. An all-solid-state battery includes a positive electrode, a negative electrode and a solid electrolyte, and contains the oxide as the solid electrolyte. The solid electrolyte may be contained in the positive electrode and/or the negative electrode as well as a separator disposed between the positive electrode and the negative electrode.

The positive electrode and the negative electrode contain an active material. As the active material, any active material known as an active material for an all-solid-state battery can be used. Examples of the active material for a lithium all-solid-state battery include $LiCoO_2$; $LiNi_xCo_{1-x}O_2$ (0<x<1); $LiNi_{1/3}Co_{1/3}Mn_{1/3}O_2$; $LiMnO_2$; heteroelement-substituted Li—Mn spinel; lithium titanate; metal lithium phosphate; transition metal oxides; $TiS_2$; carbon materials such as graphite and hard carbon; LiCoN; $SiO_2$; $Li_2SiO_3$; $Li_4SiO_4$; metal lithium, lithium alloys such as LiSn, LiSi, LiAl, LiGe, LiSb and LiP; and lithium storing intermetallic compounds such as $Mg_2Sn$, $Mg_2Ge$, $Mg_2Sb$ and $Cu_3Sb$. In the lithium all-solid-state battery, two substances with different potentials (charge-discharge potentials), which store and release lithium ions, are selected, a substance having a noble potential is defined as a positive active material, and a substance having a less noble potential is defined as a negative active material.

Electrode composites forming the positive electrode and the negative electrode may contain a solid electrolyte, a conductive agent, a binder and the like in addition to the active materials. As the solid electrolyte contained in the electrode composite, the LLZ-based oxide described above may be used. An LLZ-based oxide other than one described above, or a sulfide-based solid electrolyte may be used. As the conductive agent, for example, carbon materials such as vapor-grown carbon fibers, acetylene black, ketjen black, carbon nanotubes and carbon nanofibers, and metal materials capable of withstanding an environment at the time of using the all-solid-state battery are used. Examples of the binder include rubber-based polymers such as acrylonitrile butadiene rubber, butadiene rubber, polyvinylidene fluoride and styrene butadiene rubber.

The positive electrode and the negative electrode each include a current collector. The current collector may be a metal such as Cu, Ni, Al, V, Au, Pt, Mg, Fe, Ti, Co, Cr, Zn, Ge or In, or an alloy material containing two or more of these elements. The shape of the current collector is not particularly limited, and may be a foil shape or a mesh shape. The positive electrode and the negative electrode are formed by, for example, applying a slurry-shaped electrode composite composition to the surface of a current collector, and then performing drying. The positive electrode and the negative electrode may be prepared by molding the electrode mixture and the current collector in a dry process.

In the all-solid-state battery, the positive electrode and the negative electrode may contain a solid electrolyte as described above. The all-solid-state battery includes a solid electrolyte layer as a separator between the positive electrode and the negative electrode. It is preferable that the solid electrolyte layer also contains the above-described LLZ-based oxide. The solid electrolyte layer may contain a binder. The solid electrolyte layer can be prepared by either a wet method or a dry method.

EXAMPLES

Hereinafter, one or more embodiments of the present invention will be described in more detail by showing an example, which should not be construed as limiting one or more embodiments of the present invention.

[Preparation of Sample]

As raw material components, lithium oxide, lanthanum oxide, zirconium oxide, zinc oxide, hafnium oxide, niobium oxide and bismuth oxide were blended in the feeding amounts shown in Table 1. The raw materials were mixed and ground by a rolling ball mill, and then press-molded into cylindrical pellets using a die. The pellets were put in an alumina crucible, and the pellets were covered with powder of tetragonal $Li_7La_3Zr_2O_{12}$ (LLZ) for the purpose of suppressing volatilization of Li during firing. Firing was performed at 1100° C. for 12 hours in an atmosphere of flowing dry nitrogen. The fired pellets were ground and mixed in a mortar, and press-molded again into cylindrical pellets using a die. The molded product was placed in an alumina crucible, and the pellets were covered with powder of tetragonal LLZ in the same manner as in the firing, and held at 1230° C. for 20 hours in an atmosphere of flowing dry nitrogen to obtain a sintered body (Samples No. 1 to 13).

Evaluation (Observation of Cross-Section of Sintered Body)

Cross-sections of Samples No. 1 to 11 were each observed with a scanning electron microscope (SEM). FIGS. 1A to 1G show SEM images of Samples No. 1 to 7, respectively, and FIGS. 2A to 2D show SEM images of Samples No. 8 to 11, respectively.

<X-Ray Diffraction>

Figure 4:
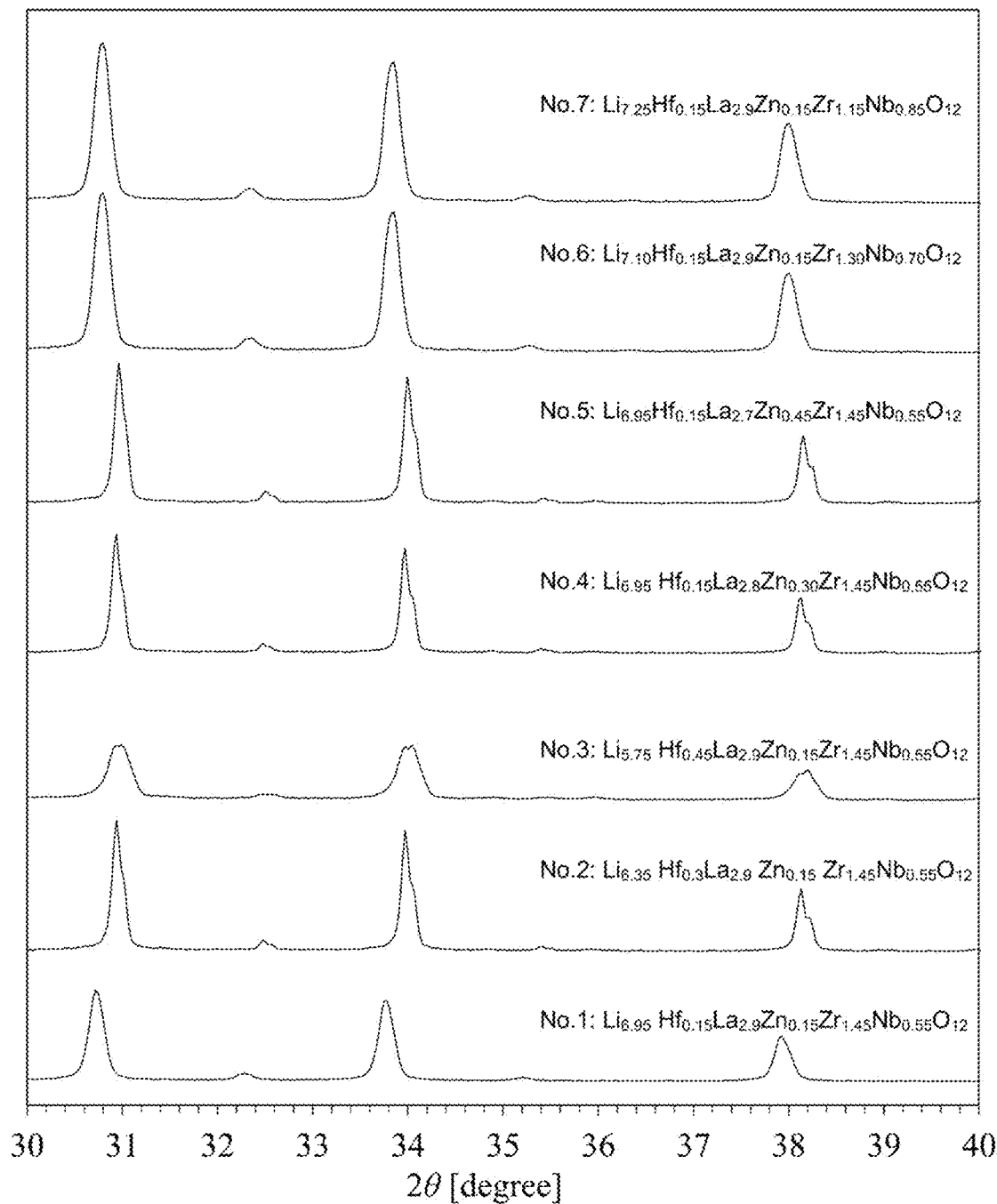
FIG. 4 is an X-ray diffraction chart of a sintered oxide in an example.
Figure 5:
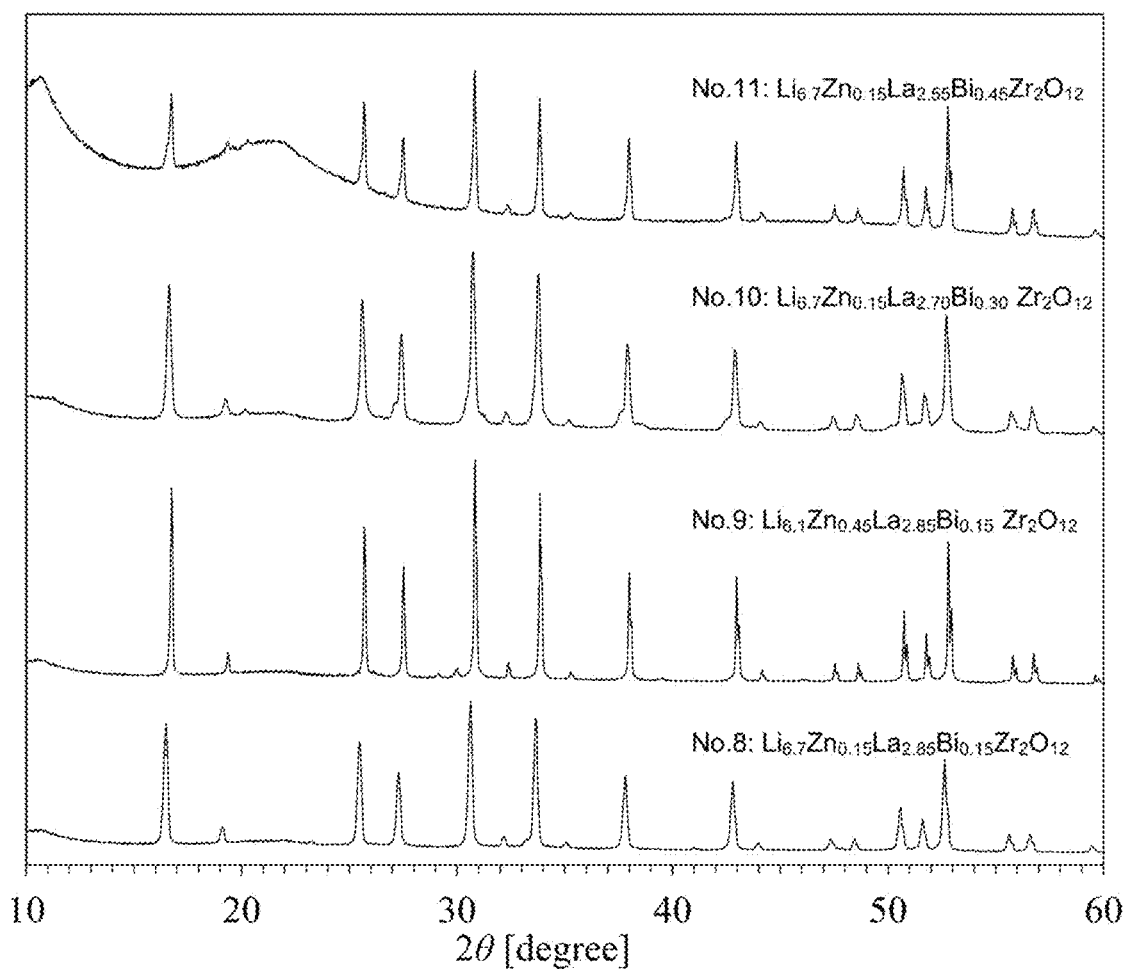
FIG. 5 is an X-ray diffraction chart of a sintered oxide in an example.
Figure 6:
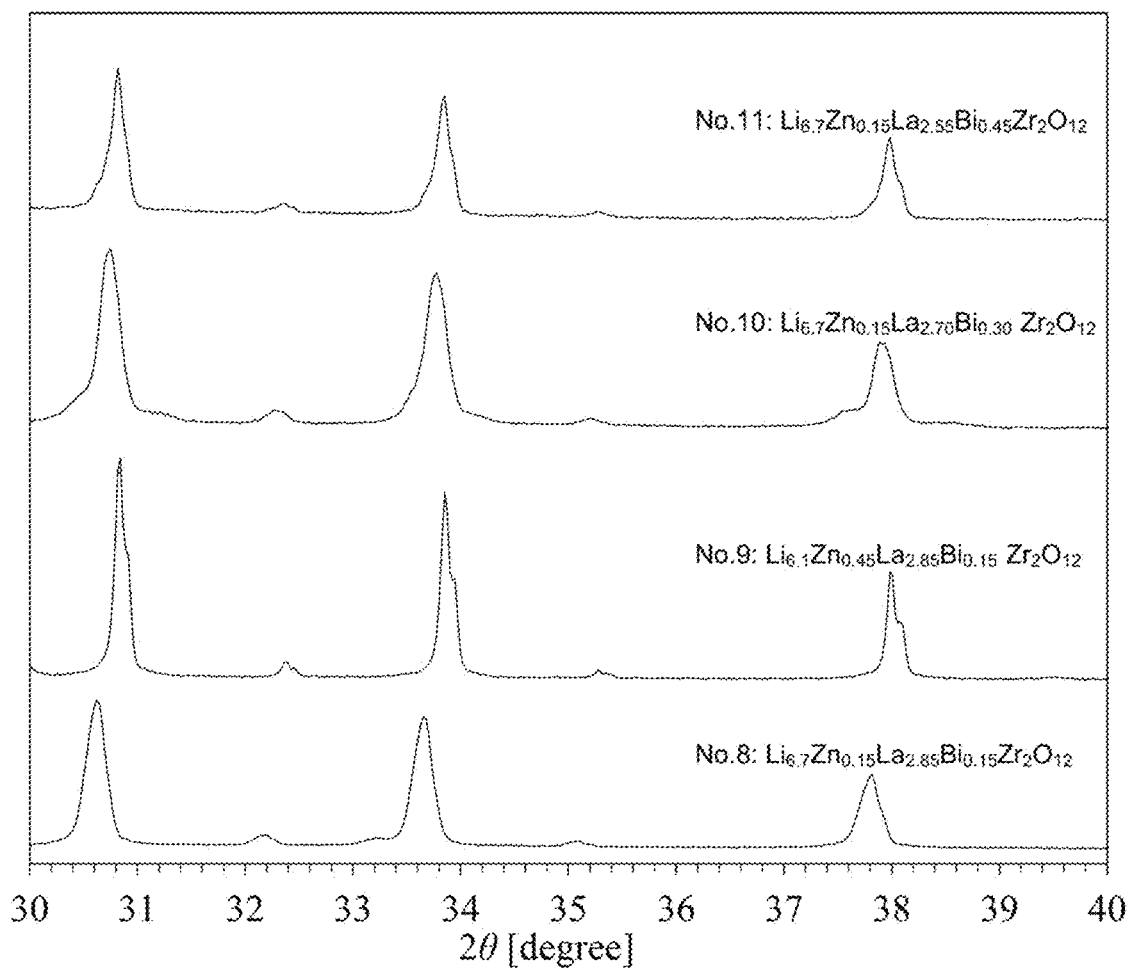
FIG. 6 is an X-ray diffraction chart of a sintered oxide in an example.

Samples No. 1 to 11 were subjected to X-ray diffraction measurement using CuKα as a radiation source. FIGS. 3 and 4 show X-ray diffraction charts for Samples No. 1 to 7, and FIGS. 5 and 6 show X-ray diffraction charts for Samples No. 8 to 11. FIGS. 3 and 5 show X-ray diffraction charts in which 2 θ ranges from 10° to 60°, and FIGS. 4 and 6 show X-ray diffraction charts in which 2 θ ranges from 30° to 40°.

<Lithium Ion Conductivity>

An electrode having a diameter of 8 mm was formed on both surfaces of each of Samples No. 1 to 13 by Au sputtering to prepare a sample for ion conductivity measurement. This sample was set in an all-solid-state battery evaluation cell (manufactured by Hohsen Corp.) in a glove box in an argon atmosphere, and connected to a potentio-galvanostat, and the ion conductivity was evaluated by alternating-current impedance measurement. The conditions for alternating-current impedance measurement were set to a frequency of 0.01 Hz to 1 MHz and a voltage of 50 mV. When two resistance components (bulk resistance and grain boundary resistance) were observed during measurement, the ion conductivity $\sigma_{bulk}$ for bulk resistance was adopted.

Table 1 shows the feeding amounts and feeding composition of the raw material and the lithium ion conductivity $\sigma_{bulk}$ for each of Samples No. 1 to 13.

TABLE 1

| Sample No. | Raw material feeding amount (mg) | | | | | | Composition ratio | $\sigma_{Bulk}$ (S/cm) |
|---|---|---|---|---|---|---|---|---|
| | $Li_2O$ | $La_2O_3$ | $ZrO_2$ | ZnO | $HfO_2$ | $Nb_2O_5$ | $Bi_2O_3$ | | |
| 1 | 602.0 | 2736.9 | 1035.2 | 70.5 | 183.0 | 372.6 | — | $Li_{6.95} Hf_{0.15} La_{2.9} Zn_{0.15} Zr_{1.45} Nb_{0.55} O_{12}$ | $4.9 \times 10^{-4}$ |
| 2 | 535.9 | 2667.5 | 1008.7 | 68.5 | 356.8 | 362.9 | — | $Li_{6.35} Hf_{0.3} La_{2.9} Zn_{0.15} Zr_{1.45} Nb_{0.55} O_{12}$ | $2.0 \times 10^{-4}$ |
| 3 | 473.0 | 2600.3 | 983.7 | 67.5 | 521.7 | 354.3 | — | $Li_{5.75} Hf_{0.45} La_{2.9} Zn_{0.15} Zr_{1.45} Nb_{0.55} O_{12}$ | $7.0 \times 10^{-5}$ |
| 4 | 604.9 | 2655.2 | 1040.1 | 142.3 | 183.5 | 373.9 | — | $Li_{6.95} Hf_{0.15} La_{2.8} Zn_{0.30} Zr_{1.45} Nb_{0.55} O_{12}$ | $3.0 \times 10^{-5}$ |
| 5 | 607.5 | 2573.0 | 1045.3 | 214.4 | 184.6 | 376.5 | — | $Li_{6.95} Hf_{0.15} La_{2.7} Zn_{0.45} Zr_{1.45} Nb_{0.55} O_{12}$ | $1.6 \times 10^{-4}$ |
| 6 | 613.8 | 2733.3 | 926.7 | 70.2 | 182.5 | 473.5 | — | $Li_{7.10} Hf_{0.15} La_{2.9} Zn_{0.15} Zr_{1.30} Nb_{0.70} O_{12}$ | $1.1 \times 10^{-4}$ |
| 7 | 625.9 | 2728.8 | 818.5 | 70.5 | 182.5 | 574.0 | — | $Li_{7.25} Hf_{0.15} La_{2.9} Zn_{0.15} Zr_{1.15} Nb_{0.85} O_{12}$ | $2.6 \times 10^{-4}$ |
| 8 | 583.4 | 2706.0 | 1436.2 | 71.4 | — | — | 204.0 | $Li_{6.7} Zn_{0.15} La_{2.85} Bi_{0.15} Zr_2 O_{12}$ | $3.2 \times 10^{-4}$ |
| 9 | 521.4 | 2658.0 | 1410.8 | 209.9 | — | — | 200.1 | $Li_{6.1} Zn_{0.45} La_{2.85} Bi_{0.15} Zr_2 O_{12}$ | $1.1 \times 10^{-4}$ |
| 10 | 576.4 | 2532.0 | 1418.9 | 70.3 | — | — | 402.8 | $Li_{6.7} Zn_{0.15} La_{2.70} Bi_{0.30} Zr_2 O_{12}$ | $1.1 \times 10^{-4}$ |
| 11 | 569.7 | 2363.3 | 1401.9 | 69.6 | — | — | 596.6 | $Li_{6.7} Zn_{0.15} La_{2.55} Bi_{0.45} Zr_2 O_{12}$ | $1.1 \times 10^{-4}$ |
| 12 | 599.4 | 2717.8 | 1442.8 | 35.8 | — | — | 203.8 | $Li_{6.85} Zn_{0.075} La_{2.85} Bi_{0.15} Zr_2 O_{12}$ | $4.1 \times 10^{-5}$ |
| 13 | 604.7 | 2722.2 | 1445.0 | 23.8 | — | — | 205.1 | $Li_{6.9} Zn_{0.05} La_{2.85} Bi_{0.15} Zr_{2.0} O_{12}$ | $2.6 \times 10^{-5}$ |

Samples No. 1 to 13 each exhibited a lithium ion conductivity in the order of $10^{-5}$ S/cm or $10^{-4}$ S/cm, and the conductivity was higher than that of unsubstituted LLZ (lithium ion conductivity: $10^{-6}$ S/cm to $10^{-7}$ S/cm) due to introduction of substitution elements.

Among Samples No. 1 to 7 containing Zn, Hf and Nb as substitution elements, Sample No. 1 exhibited the highest lithium ion conductivity. Samples No. 2 and 3 with a larger amount of substitution with Hf as compared to Sample No. 1 had a conductivity lower than that of Sample No. 1. From FIGS. 1B and 1C, it can be seen that Samples No. 2 and 3 have larger voids as compared to Sample No. 1. In the X-ray diffraction chart of FIG. 4, it can be seen that Samples No. 2 and 3 have a diffraction peak shifted to the high-angle side (a smaller lattice constant) as compared to Sample No. 1. This may be because Li is substituted with Hf having a relatively small ion radius. It is considered that Samples No. 2 and 3 had a conductivity smaller than that of Sample No. 1 because in Samples No. 2 and 3, the lattice constant decreased to narrow the diffusion path for lithium ions and the content of Li decreased as the amount of substitution with Hf increased.

Samples No. 4 and 5 with a larger amount of substitution with Zn as compared to Sample No. 1 also had a conductivity lower than that of Sample No. 1. One reason why Samples No. 4 and 5 had a conductivity smaller than that of Sample No. 1 may be that in Samples No. 4 and 5, the diffusion path for lithium ions was narrowed with the diffraction peak shifted to the high-angle side as compared to Sample No. 1 in the X-ray diffraction chart of FIG. 4.

Samples No. 6 and 7 with a larger amount of substitution with Nb as compared to Sample No. 1 had a conductivity slightly lower than that of Sample No. 1. It was expected that substitution of Zr with Nb would increase the content of Li for compensation for a charge difference, leading to an increase in conductivity. However, such a phenomenon was not observed. In the X-ray diffraction chart of FIG. 4, Samples No. 6 and 7 have a diffraction peak slightly shifted to the high-angle side as compared to Sample No. 1. A shift to a larger angle was observed in Samples No. 6 and 7 with a large amount of substitution with Nb, in spite that there is no difference between ion radius between $Zr^{4+}$ with a coordination number of 6 and $Nb^{3+}$ with a coordination number of 6. This is assumed to be because all or part of Nb introduced as a substitution element was introduced into the La site and/or Nb was introduced as $Nb^{5+}$ into the Zr site. It is considered that introduction of $Nb^{5+}$ into the La site and/or the Zr site reduces the lattice constant because $Nb^{5+}$ with a coordination number of 8 has an ion radius smaller than that of $La^{3+}$ with a coordination number of 8 and $Nb^+$ with a coordination number of 6 has an ion radius smaller than that of $Zr^{4+}$ with a coordination number of 6. The Li content being decreased by introduction of Nb as $Nb^+$ may also be a factor of a decrease in the ion conductivity.

From the X-ray diffraction charts of Samples No. 1 to 7 (FIGS. 3 and 4), it was shown that all the samples were cubic, and Sample No. 1 had a single phase, whereas there were a plurality of phases in Samples No. 2 to 7. In Sample No. 1, maintenance of the LLZ garnet-type structure may be related to a high ion conductivity.

Among Samples No. 8 to 13 containing Zn and Bi as substitution elements, Sample No. 8 exhibited the highest ion conductivity. Sample No. 9 with a larger amount of substitution with Zn and Samples No. 12 and 13 with a smaller amount of substitution with Zn as compared to Sample No. 8 had a conductivity lower than that of Sample No. 8. In Samples No. 12 and 13, the effect of introducing Zn as a substitution element may be small. One reason for the decrease in conductivity may be that in Sample No. 9, the lattice constant decreased and the diffusion path for Li ions was narrowed with the diffraction peak shifted to the high-angle side as compared to Sample No. 8 in the X-ray diffraction chart of FIG. 6.

Samples No. 10 and 11 with a larger amount of substitution with Bi as compared to Sample No. 8 tended to have a diffraction peak shifted to the high-angle side with an increase in amount of substitution with Bi. In addition, Sample No. 8 had a single phase, whereas there were a plurality of phases in Samples No. 9 to 11. In Sample No. 8, maintenance of the LLZ garnet-type structure may also be related to a high ion conductivity.

As shown in the above-described results of evaluation of Samples No. 1 to 13, an LLZ-based oxide containing Zn as a substitution element has an excellent lithium ion conductivity. In addition, it may be possible to further improve the lithium conductivity by adjusting the amount of substitution with Zn and the type and amount of a substitution element other than Zn.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed:

1. A garnet-type oxide comprising Li, La, Zr and O as main constituent elements,
   wherein the garnet-type oxide contains the main constituent elements and substitution elements including at least Zn and Bi, and
   wherein the garnet-type oxide has a composition of $Li_{(7-2j)}Zn_jLa_{(3-k)}Bi_kZr_2O_{(2-\delta)}$, wherein j, k, and $\delta$ are:
   $0.05 \leq j < 3.5$;
   $0.05 \leq k < 3$; and
   $0 \leq \delta < 1$.

2. A garnet-type oxide comprising Li, La, Zr and O as main constituent elements,
   wherein the garnet-type oxide contains the main constituent elements and substitution elements including at least Zn Nb and Hf, and
   wherein the garnet-type oxide has a composition of $Li_{(7-4x+z)}Hf_xLa_{(3-2y/3)}Zn_yZr_{(2-z)}Nb_zO_{(2-\delta)}$, wherein x, y, z, and $\delta$ are:
   $0.01 \leq x < 1.75$,
   $0.05 \leq y < 3$,
   $0.05 \leq z < 2$, and
   $0 \leq \delta < 1$.

3. A solid electrolyte comprising the garnet-type oxide according to claim 1.

4. An all-solid-state lithium ion secondary battery comprising:
   a positive electrode;
   a negative electrode; and
   a solid electrolyte layer disposed between the positive electrode and the negative electrode,
   wherein the solid electrolyte layer contains the garnet-type oxide according to claim 1.

5. A solid electrolyte comprising the garnet-type oxide according to claim 2.

6. An all-solid-state lithium ion secondary battery comprising:
   a positive electrode;
   a negative electrode; and
   a solid electrolyte layer disposed between the positive electrode and the negative electrode,
   wherein the solid electrolyte layer contains the garnet-type oxide according to claim 2.

7. The garnet-type oxide according to claim 1, wherein the composition of $Li_{(7-2j)}Zn_jLa_{(3-k)}Bi_kZr_2O_{(12-\delta)}$ satisfies at least one of $0.05 \leq j \leq 1$ and $0.05 \leq k \leq 1$.

8. The garnet-type oxide according to claim 2, wherein the composition of $Li_{(7-4x+z)}Hf_xLa_{(3-2y/3)}Zn_yZr_{(2-z)}Nb_zO_{(12-\delta)}$ satisfies at least one of $0.05 \leq x \leq 1.75$, $0.15 \leq y \leq 3$, and $0.3 \leq z < 2$.

* * * * *

UNITED STATES PATENT AND TRADEMARK OFFICE
CERTIFICATE OF CORRECTION

PATENT NO. : 12,249,686 B2
APPLICATION NO. : 17/703087
DATED : March 11, 2025
INVENTOR(S) : Kazuaki Kanai et al.

It is certified that error appears in the above-identified patent and that said Letters Patent is hereby corrected as shown below:

In the Claims

At Column 9, Claim number 1, Line number 16:
"$O_{(2-\delta)}$" should read -- $O_{(12-\delta)}$ --; and At Column 9, Claim number 2, Line number 26:
"$O_{(2-\delta)}$" should read -- $O_{(12-\delta)}$ --.

Signed and Sealed this
Twenty-second Day of April, 2025

Coke Morgan Stewart
*Acting Director of the United States Patent and Trademark Office*